US008838552B2

(12) United States Patent
Kashiwagi et al.

(10) Patent No.: US 8,838,552 B2
(45) Date of Patent: Sep. 16, 2014

(54) DATABASE PROCESSING DEVICE, DATABASE PROCESSING METHOD, AND RECORDING MEDIUM

(75) Inventors: Takehiko Kashiwagi, Tokyo (JP); Junpei Kamimura, Tokyo (JP)

(73) Assignee: NEC Corporation, Tokyo (JP)

(*) Notice: Subject to any disclaimer, the term of this patent is extended or adjusted under 35 U.S.C. 154(b) by 60 days.

(21) Appl. No.: 13/426,543

(22) Filed: Mar. 21, 2012

(65) Prior Publication Data
US 2012/0246128 A1 Sep. 27, 2012

(30) Foreign Application Priority Data

Mar. 24, 2011 (JP) ................... 2011-065171
Mar. 5, 2012 (JP) ................... 2012-048079

(51) Int. Cl.
*G06F 7/00* (2006.01)
*G06F 17/30* (2006.01)

(52) U.S. Cl.
CPC .... *G06F 17/30289* (2013.01); *G06F 17/30312* (2013.01)
USPC .......................................... 707/693; 707/736

(58) Field of Classification Search
None
See application file for complete search history.

(56) References Cited

U.S. PATENT DOCUMENTS

| | | | |
|---|---|---|---|
| 4,075,704 A * | 2/1978 | O'Leary ........................ | 708/507 |
| 7,162,581 B2 * | 1/2007 | Newman et al. ............. | 711/115 |
| 8,327,109 B2 * | 12/2012 | Caspole ....................... | 711/173 |
| 2007/0285287 A1 * | 12/2007 | Hussain et al. ................. | 341/50 |
| 2010/0174701 A1 * | 7/2010 | Burger .......................... | 707/713 |
| 2010/0328115 A1 * | 12/2010 | Binnig et al. .................. | 341/51 |
| 2011/0310108 A1 * | 12/2011 | Shiraki ......................... | 345/520 |

OTHER PUBLICATIONS

Higashi Ryuichi, et al., "An Investigation of CUDA based Fast Full Text Search for Large-Scale Texts on Main Memory", The Institute of Electronics, Information and Communication Engineers, Information Processing Society Of Japan, No. 19, 2008, pp. 139-144.
Japanese Office Action dated Nov. 28, 2012, with concise explanation of the relevance.
1. Bingsheng He, "Mars: a MapReduce framework on graphics processors," PACT '08 Proceedings of the 17th international conference on Parallel architectures and compilation techniques, ACM, Oct. 29, 2008, pp. 260-269, URL, http://dl.acm.org/citation.cfm?id=1454152.
2. Wenbin Fang, "Database compression on graphics processors," Proceedings of the VLDB Endowment, ACM, Sep. 2010, vol. 3 Issue 1-2, pp. 670-680, URL, http://dl.acm.org/citation.cfm?id=1920927.

* cited by examiner

*Primary Examiner* — Fred I Ehichioya
*Assistant Examiner* — Hasanul Mobin
(74) *Attorney, Agent, or Firm* — McGinn IP Law Group, PLLC (57) ABSTRACT

The database system of the present invention decides a fragment length responding to a unit of a data process of a parallel arithmetic unit, and stores tuple data containing variable-length data into a fragment and metadata of the fragment into a fragment header, respectively, in a column store database. The database system refers to the metadata when executing a process for data stored in the column store database, decides the fragments to be assigned to each thread that is executed by the parallel arithmetic unit, assigns the fragments to each thread based upon the decided content, and causes each thread to execute a parallel arithmetic operation.

16 Claims, 8 Drawing Sheets

| FragmentHeader | | Fragment | | | | | | | |
|---|---|---|---|---|---|---|---|---|---|
| Length | ctid | 1 | 2 | 3 | ... | ... | ... | ... | N |
| 4 | 8 | A | B | C | D | (undef) | (undef) | (undef) | (undef) |
| 20 | 9 | A | A | E | D | ... | Z(20) | (undef) | (undef) |
| N | 2 | D | D | W | x | X | x | x | F |
| i | 2 | R | R | R | f(i) | (undef) | (undef) | ... | (undef) |
| N | 6 | 1 | 1 | 1 | 2 | 2 | 3 | 3 | 8 |
| N*2 | 6 | q | q | q | R | T | y | y | y |
| J | 6 | s | s | S(j) | (undef) | (undef) | (undef) | (undef) | (undef) |
| . | . | . | . | . | . | . | . | . | . |
| P | Id | T | T | T(P) | (undef) | ... | ... | ... | (undef) |
| | | | | | | | | | |
| | | | | | | | | | |

| Result ID | Result of Fragment Search | | | | | | | |
|---|---|---|---|---|---|---|---|---|
| Fragment ID | 1 | 2 | 3 | 4 | 5 | 6 | ... | m |
| 0 | 0 | 1 | 0 | 0 | 0 | 1 | ... | 0 |
| 1 | | | | | | | ... | |
| 2 | | | | | | | ... | |
| 3 | | | | | | | ... | |
| 4 | | | | | | | ... | |
| 5 | | | | | | | ... | |
| 6 | | | | | | | ... | |
| ⋮ | ⋮ | ⋮ | ⋮ | ⋮ | ⋮ | ⋮ | ⋮ | ⋮ |

FIG. 5

| ResultID | Result of Tuple Search | | | | | | | |
|---|---|---|---|---|---|---|---|---|
| Tuple ID | 1 | 2 | 3 | 4 | 5 | 6 | ... | m |
| 0 | 1 | 1 | 0 | 0 | 0 | 1 | ... | 0 |
| 1 | | | | | | | ... | |
| 2 | | | | | | | ... | |
| 3 | | | | | | | ... | |
| 4 | | | | | | | ... | |
| 5 | | | | | | | ... | |
| 6 | | | | | | | ... | |
| ⋮ | ⋮ | ⋮ | ⋮ | ⋮ | ⋮ | ⋮ | ... | ⋮ |

FIG. 8 ical unit for performing an instruction supply for a plurality of the arithmetic units. So as to exhibit a high processing performance by employing the GPGPU, it is required to make the number of branch instructions small, and yet it is required that not only the data supply amount to one of a certain set of the arithmetic units coincides to the data supply amount to the other, but also continuity of the data to be supplied is kept.
DATABASE PROCESSING DEVICE, DATABASE PROCESSING METHOD, AND RECORDING MEDIUM

INCORPORATION BY REFERENCE

This application is based upon and claims the benefit of priority from Japanese patent application No. 2011-065171, filed on Mar. 24, 2011, and Japanese patent application No. 2012-048079, filed on Mar. 5, 2012, the disclosure of which is incorporated herein in its entirety by reference.

BACKGROUND OF THE INVENTION

The present invention relates to a database technology based upon GPGPU (General Purpose computing on Graphics Processing Units).

In recent years, attention is paid to the GPGPU technology of causing a parallel arithmetic unit such as a GPU (Graphics Processing Unit) to perform a general purpose arithmetic process. The GPU is higher in a degree of parallelism of the arithmetic units and is higher in a throughput of the arithmetic operation than a CPU (Central Processing Unit). Further, the GPU has a configuration similar to that of a SIMD arithmetic unit for performing an instruction supply for a plurality of the arithmetic units. So as to exhibit a high processing performance by employing the GPGPU, it is required to make the number of branch instructions small, and yet it is required that not only the data supply amount to one of a certain set of the arithmetic units coincides to the data supply amount to the other, but also continuity of the data to be supplied is kept.

It is thinkable that the data structure based upon column store is a structure suitable for the process that is performed by the parallel arithmetic unit such as the GPGPU. The data process of fixed length data is expressed as a sequence of fixed lengths column by column owing to the column store, whereby it is enough to supply this for the data process with the GPGPU.

For example, the technology of, for one large-scale text, performing full text research of its content with a help of the GPGPU is disclosed in Non-Patent literature 1.

HIGASHI RYUICHI, FUJIMOTO NORIYUKI, and HAGIWARA KENICHI "An Investigation of CUDA based Fast Full Text Search for Large-Scale Texts on Main Memory", The Institute of Electronics, Information and Communication Engineers, Information Processing Society of Japan, No. 19, 2008, pp 139-144.

However, the database for efficiently storing a data group containing variable-length data, and the database processing method of efficiently processing such a database have not been realized yet.

SUMMARY OF THE INVENTION

The present invention has been accomplished in consideration of the above-mentioned problems, and an object thereof is provide a database processing system, a database processing method, and the like that can realizing the efficient database process for the variable-length data as well by employing the parallel arithmetic unit.

The present invention is a database processing device including: a parallel arithmetic unit; a data storing section that decides a fragment length responding to a unit of a data process of the aforementioned parallel arithmetic unit, and stores tuple data containing variable-length data into a fragment and metadata of the aforementioned fragment into a fragment header, respectively, in a column store database; and a parallel arithmetic section that refers to the aforementioned metadata when executing a process for data stored in the aforementioned column store database, decides the fragments to be assigned to each thread that is executed by the aforementioned parallel arithmetic unit, assigns the fragments to the aforementioned each thread based upon the decided content, and causes each thread to execute a parallel arithmetic operation.

The present invention is a database processing method in a database processing device including a parallel arithmetic unit that includes: a data storing step of deciding a fragment length responding to a unit of a data process of the aforementioned parallel arithmetic unit, and storing tuple data containing variable-length data into a fragment and metadata of the aforementioned fragment into a fragment header, respectively, in a column store database; and a parallel arithmetic step of referring to the aforementioned metadata when executing a process for data stored in the aforementioned column store database, deciding the fragments to be assigned to each thread that is executed by the aforementioned parallel arithmetic unit, assigning the fragments to the aforementioned each thread based upon the decided content, and causing each thread to execute a parallel arithmetic operation.

The present invention is a non-transitory computer readable storage medium storing a program for causing a computer including a parallel arithmetic unit to execute: a data storing process of deciding a fragment length responding to a unit of a data process of the aforementioned parallel arithmetic unit and storing tuple data containing variable-length data into a fragment and metadata of the aforementioned fragment into a fragment header, respectively, in a column store database; and a parallel arithmetic process of referring to the aforementioned metadata when executing a process for data stored into the aforementioned column store database, deciding the fragments to be assigned to each thread that is executed by the aforementioned parallel arithmetic unit, assigning the fragments to each thread based upon the decided content, and causing the each thread to perform a parallel arithmetic operation.

In accordance with the present invention, the efficient database process can be realized for the variable-length data as well by employing the parallel arithmetic unit.

BRIEF DESCRIPTION OF THE DRAWINGS

This and other objects, features and advantages of the present invention will become more apparent upon a reading of the following detailed description and drawings, in which.

EXEMPLARY EMBODIMENTS

Hereinafter, the exemplary embodiments of the present invention will be explained by referring to the accompanied drawings.

Figure 1:
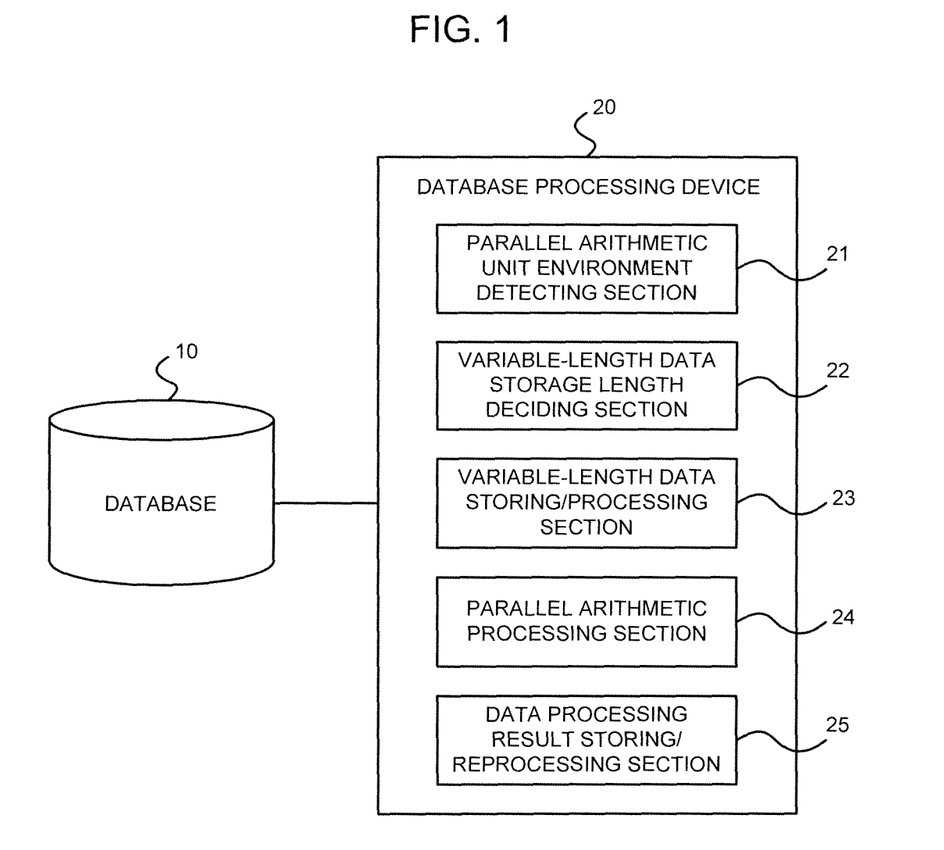
FIG. 1 is a schematic view of a system configuration of the database system relating to an exemplary embodiment of the present invention.

FIG. 1 is a schematic view of a system configuration of the database system relating to the exemplary embodiment of the present invention. As shown in the figure, this system includes a database 10 and a database processing device 20, which are connected via a network such as a LAN (Local Area Network).

The database 10 is a column store database. A unit of management of the database 10 is a tuple, a column, a table, and a schema, each of which can be stored in a plural number into the higher-ranked structure. The tuple contains data of a certain line inside the database. The data of a specific column are collected inside a certain column store in a unit of the tuple.

The database processing device 20 includes a host computer, a coprocessor (parallel arithmetic unit) and the like as a component. The database processing device 20 includes a parallel arithmetic unit environment detecting section 21, a variable-length data storage length deciding section 22, a variable-length data storing/processing section 23, a parallel arithmetic processing section 24, and a data processing result storing/reprocessing section 25.

The parallel arithmetic unit environment detecting section 21 acquires information (a unit of the data process and the like) associated with a processing ability of the parallel arithmetic unit (GP(1)) of this device. The variable-length data storage length deciding section 22 decides a data storage length (a fragment length) in the database 10 based upon the information acquired by the parallel arithmetic unit environment detecting section 21.

The variable-length data storing/processing section 23 stores the data into the database 10 based upon the data storage length decided by the variable-length data storage length deciding section 22. The variable-length tuple data (column tuple) containing the fixed-length data of which the unit is a column unit is stored into the fixed-length fragment. The tuple data of a certain column is stored into a fragment set that is composed of a plurality of the fragments responding to a necessity.

Figure 2:
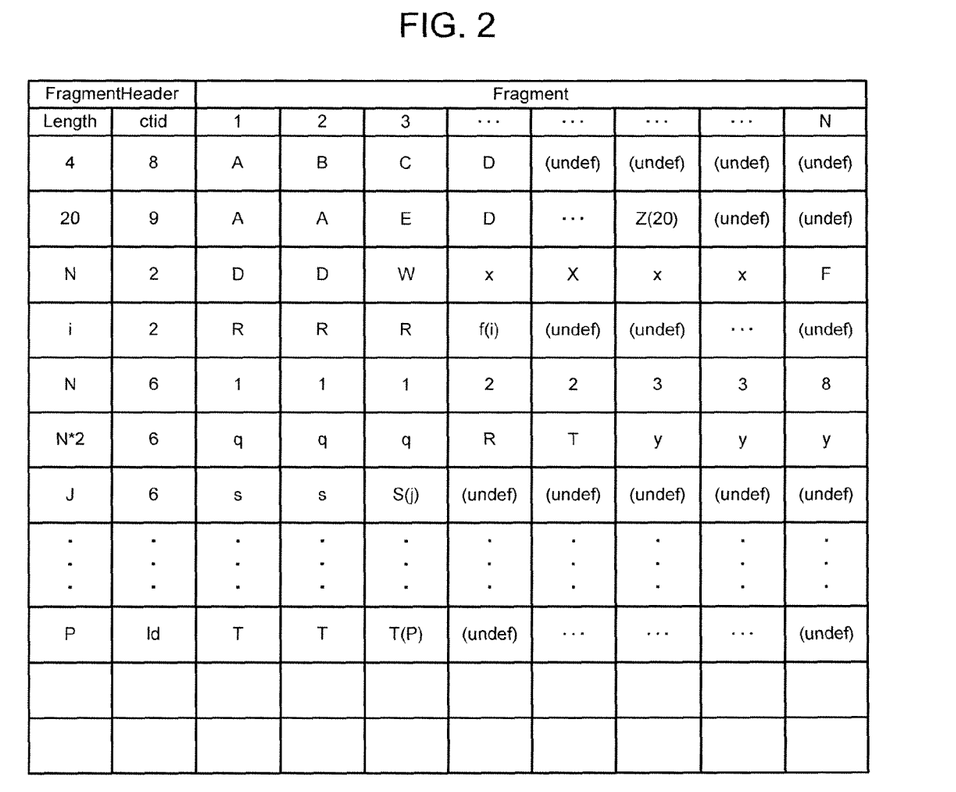
FIG. 2 is a view illustrating one example of a data structure of the database.

One example of the data structure of the database 10 is shown in FIG. 2. As shown in the figure, the data to be stored into the database 10 contains the fragments, and the fragment headers attached to the above fragments. The fragment has partial data of one column tuple or an entirety thereof stored therein. The fragment header has the metadata associated with the column tuples stored therein. The fragments belonging to the identical tuple are continuously stored without fail. The fragment header is indicative of a number (ctid) indicating the order in which the partial data of the column tuple has been stored, and an offset (Length) of the data position of the last portion of the above fragment from a leading position of the tuple.

While the fragment length could be a fixed length in terms of each column within the fragment set, the fragment length can be set independently for each column or for each fragment set. The variable-length data storage length deciding section 22 measures the data length that appears within the column or the fragment set, thereby making a possible to introduce the fragment length matched to the processing ability of the parallel arithmetic unit that enables a processing efficiency or a space efficiency to be enhanced by employing an appropriate algorithm. For example, the variable-length data storage length deciding section 22 may set the data length (a four-byte length, an eight-byte length, a 16-byte length, a 32-byte length, a 64-byte length and the like) suitable for a unit of the data process of the parallel arithmetic unit, as the storage length. Further, the variable-length data storage length deciding section 22 may set an average value of the data lengths of the variable-length data, and further, may set the data length in the adjacent of the above average value that is suitable for a unit of the data process of the parallel arithmetic unit, as the storage length.

The parallel arithmetic processing section 24 executes the parallel arithmetic process for the data stored into the database 10. The data processing result storing/reprocessing section 25 processes the arithmetic result by the parallel arithmetic processing section 24.

Next, an operation of the database system relating to this exemplary embodiment will be explained with a case of retrieving a certain character sequence from the database 10 exemplified.

With regard to an execution process of the retrieval, there exist a case 1 in which the process of riding on the fragment is required, and a case 2 in which the process of riding on the fragment is not required.

The above-mentioned case 1 includes a case in which the retrieval-target character sequence (variable-length byte sequence) is longer than the byte length of a unit of the process/storage of the fragment, and the retrieval-target tuple of the database is configured of a plurality of the fragments. In this case, a multi-stage process is executed by causing each thread to take charge of the duplicated fragments. The N-th thread takes charge of the N-th fragment and (N+1)-th fragment, and the (N+1)-th thread takes charge of the (N+1)-th fragment and (N+2)-th fragment. The hindmost thread takes charge of the END-th fragment.

The above-mentioned case 2 includes the retrieval in the case in which the target data can be entered into the fragment in a unit of management of the shortest length (byte) at a single shot, and the retrieval in the case in which, with regard to all fragments, one fragment can constitute the tuple, respectively. The execution process of these retrievals can be executed as a special example of the above-mentioned case 1, and the fast process is enabled because the number of the processing stages is not made plural. Thus, hereinafter, explanation will be made by referring to FIG. 3 with the above-mentioned case 1 at a center.

Figure 3:
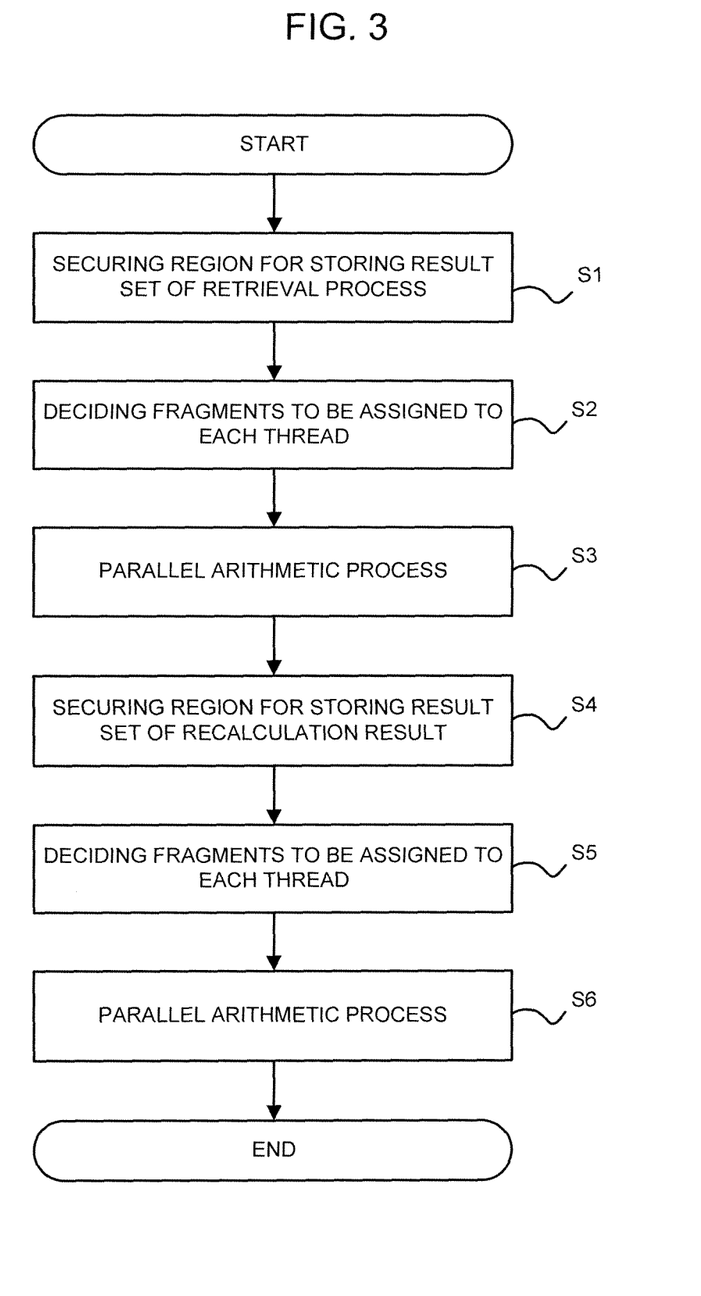
FIG. 3 is a flowchart for explaining an operation of the database system.

At first, the parallel arithmetic processing section 24 secures the region for storing the result set of the retrieval process (Step S1). The region for securing the result of the retrieval is given with bits for each byte inside the fragment in order to cope with a plurality of the hit results and the like. Specifically, the bit position equivalent to the first byte of the retrieval-target byte sequence is reversed in the region for storing the result set.

The parallel arithmetic processing section 24 decides the fragments to be assigned to each thread that is executed by the parallel arithmetic unit by referring to the metadata affixed to the fragment (Step S2). At this time, the number of the fragments that one thread processes is varied according to the fragment length. For example, setting a least common multiple of eight, being a bit length of the byte, and a byte length of the fragment enables the result set having no gap to be acquired and yet the data having the identical length to be given to all threads. For example, with the fragment of which the fragment length is four bytes, two fragments may be given to the thread. With the fragment of which the fragment length is eight bytes, one fragment may be given to the thread. With the fragment of which the fragment length is 16 bytes, one fragment may be given to the thread. Further, the fragments to be assigned to each thread may be decided based upon a unit of the data process of the parallel arithmetic unit. With the 32-bit arithmetic unit, the data length to be given to each thread is set so that it is a multiple of 32 bits.

The parallel arithmetic process is executed based upon the content decided in the Step S2 (Step S3). Specifically, the following processes are executed by each thread. When the thread is given the variable-length byte sequence, being a retrieval target, it calculates a length of the retrieval-target byte sequence. Further, the thread is given the position of the fragment set of which charge the above thread should take. The thread executes a retrieval process of sequentially loading the designated fragments and determining whether the retrieval-target byte sequence appears in the loaded fragment set.

Additionally, with regard to the condition under which the retrieval process is executed, the thread may execute the retrieval process when a total length of the data stored inside the sequential fragments given so far is calculated and a predetermined condition [(a total length of the data is equal to or more than (a retrieval-target byte sequence length−1)+a sequential fragment data length] is satisfied. That is, with regard to the condition under which the retrieval process is executed, the thread may execute the retrieval process when the not-processed data length inside the fragments for which the process is currently being executed is longer than the retrieval-target byte sequence. When the condition is not satisfied, the thread may successively load the next fragments, calculate the total length of the data, and determine whether the calculated total length of the data satisfies the above-mentioned condition.

Figure 4:
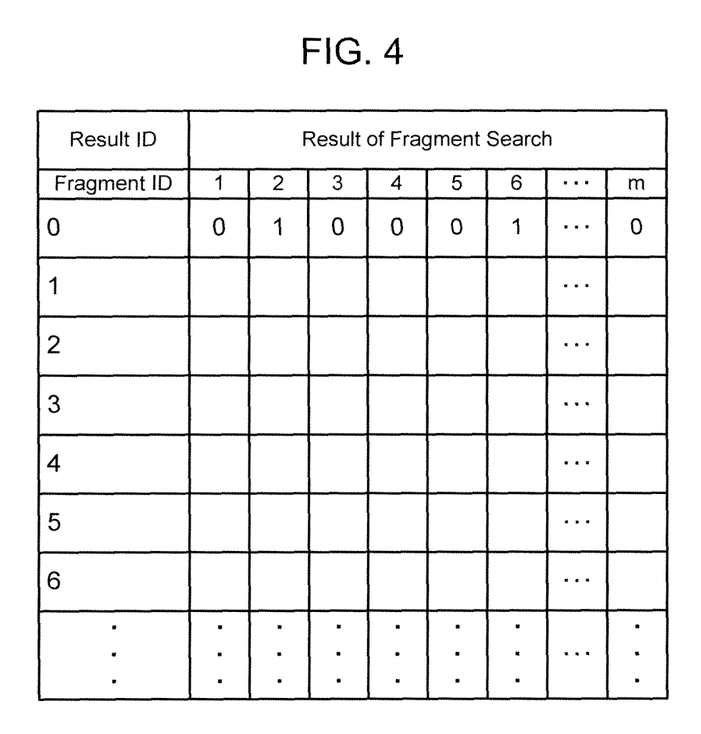
FIG. 4 is a view for exemplifying a retrieval processing result recorded in a storing region.

In the retrieval process, it is assumed that the retrieval-target byte sequence has been detected when the leading offset of the retrieval-target byte sequence exists inside the leading fragment of which charge the above thread takes and yet one tuple ID has been detected in a matching region of the retrieval-target byte sequence, a bit of the starting position thereof is reversed, and the above result is defined as a retrieval processing result. The above retrieval processing result is recorded in a unit of the thread into the region subjected to byte alignment. An example of the retrieval processing result to be recorded into a predetermined storing region is shown in FIG. 4.

Next, the data processing result storing/reprocessing section 25 secures the region for storing the result set of the recalculating process in order to execute the recalculating process for the above-mentioned retrieval processing result (Step S4). With the result of the recalculation, it is enough to secure a one-bit capacity for one tuple. That is, the capacity of (a tuple number*a bit number+an alignment number) is required.

The data processing result storing/reprocessing section 25 decides the fragments to be assigned to each thread (Step S5). At this time, setting a multiple of eight, being the bit length of the byte, for the number of the tuples to be assigned to one thread enables the result set of the tuple level having no gap to be acquired and yet the data having the identical length to be given to all threads. Further, the data processing result storing/reprocessing section 25 may decide the fragments to be assigned based upon a unit of the data process of the parallel arithmetic unit. When a unit of the data process of the parallel arithmetic unit is 32 bits, the data length to be given to each thread may be set so that it is a multiple of 32 bits.

The parallel arithmetic process is executed based upon the content decided in the Step S5 (Step S6). Specifically, the following processes are executed by each thread. The thread is notified of the tuple ID of which charge it takes, a position in its charge of loading the result set of the retrieval process, and a position in its charge of the fragment set.

Figure 5:
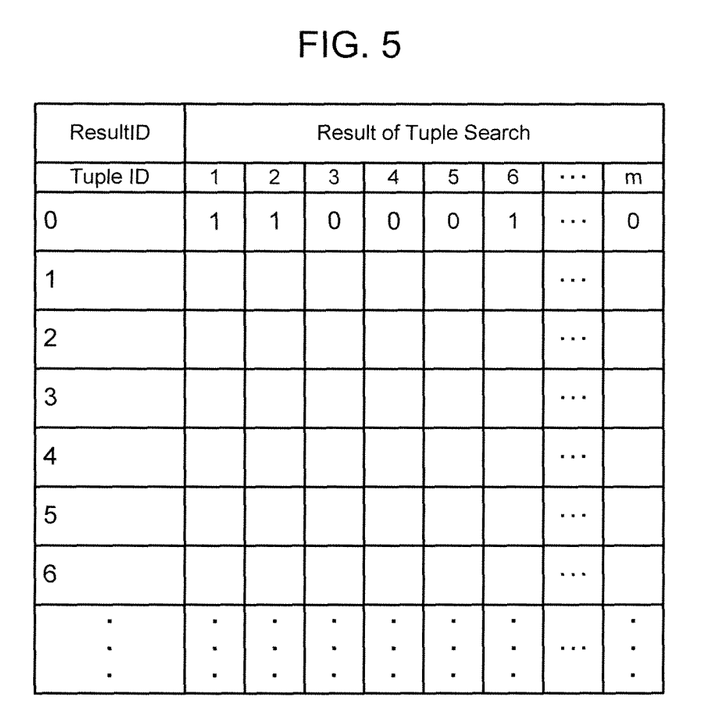
FIG. 5 is a view for exemplifying a reprocessing result recorded in a predetermined storing region.

Each thread executes the following process for the tuple ID of which charge it takes. The thread loads the fragment from the notified position, and calculates the tuple ID thereof. The thread determines whether the calculated tuple ID is the tuple ID of which charge it takes, and loads the corresponding retrieval result when it is the tuple ID of which charge it takes, and when a flag has been raised, the thread determines that the retrieval-target byte sequence exists in the above tuple, and raises a flag with a tuple level. The above retrieval processing result is recorded in a unit of the thread into the region subjected to byte alignment. An example of the retrieval processing result recorded into a predetermined storing region is shown in FIG. 5. This allows whether or not the retrieval-target byte sequence exists in each tuple to be shown.

Figure 6:
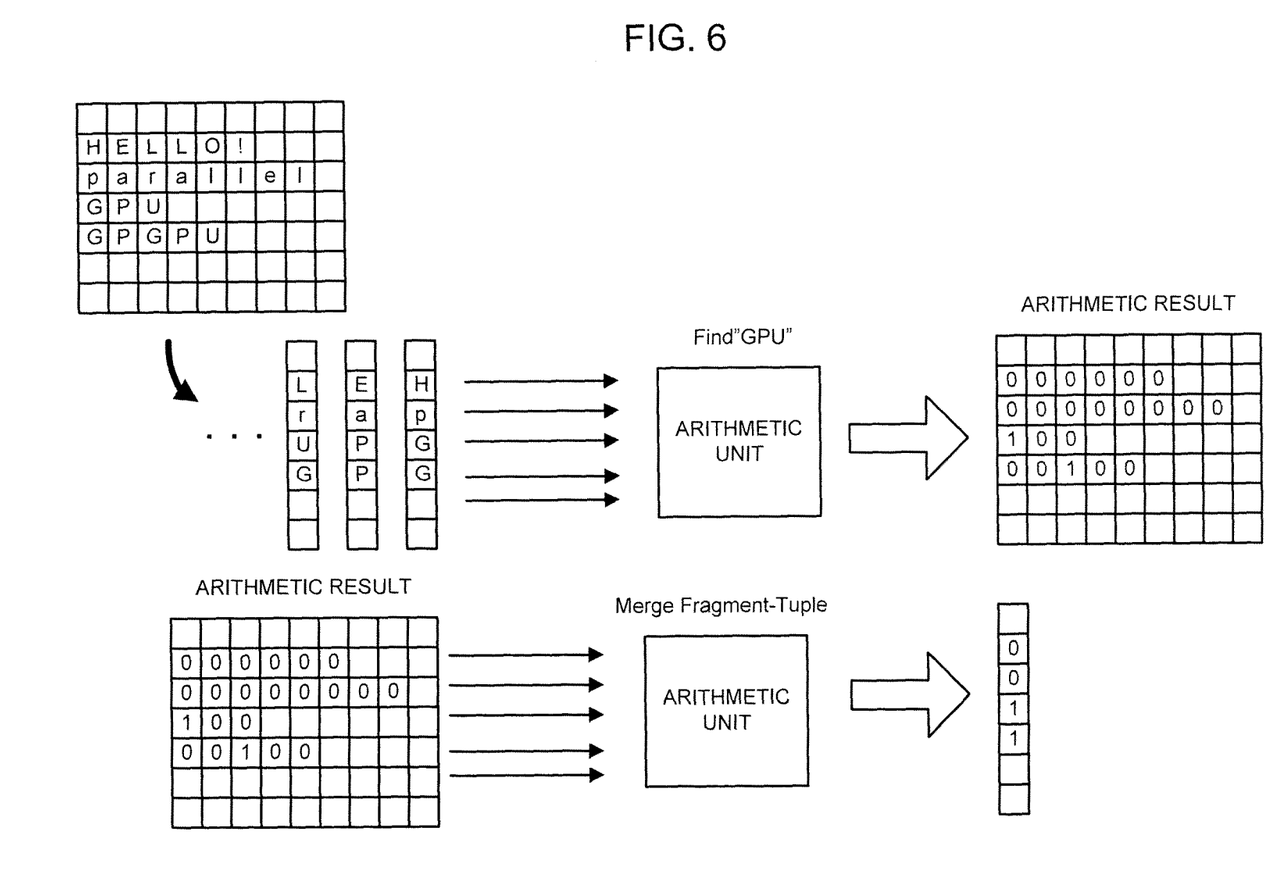
FIG. 6 is a view for exemplifying an outline of an operation of this database system.

Additionally, an outline of the operation of this database system described above is shown in FIG. 6. In an example of FIG. 6, in the database, the tuple data such as "HELLO!", "parallel", "GPU", and "GPGPU" is stored into each fragment. With regard to the process of retrieving the byte sequence "GPU", the parallel arithmetic processing section 24 secures the region for storing the result of the retrieval process and decides the fragments to be assigned to each thread that is executed by the parallel arithmetic unit, based upon the metadata and a unit of the data process of the parallel arithmetic unit. The fragments are assigned to each thread based upon this decided content. Each thread executes the arithmetic operation of retrieving the byte sequence "GPU" for the assigned fragments, and records the process result. In FIG. 6, the bit existing in the leading position of the region corresponding to the byte sequence in which "GPU" has been detected is reversed in the record region of the arithmetic result. Next, the data processing result storing/reprocessing section 25 secures the region for storing the processing result obtained by recalculating the arithmetic result and decides the tuples to be assigned to each thread. At this time, the parallel arithmetic processing section 24 sets a multiple of eight for the number of tuples to be assigned to each thread. Each thread loads the arithmetic result corresponding to the assigned tuple and raises the flag as the process result of the above tuple when the flag has been raised for the loaded arithmetic result. In FIG. 6, flags "1" are raised as the result of processing "100" and "00100", being the arithmetic result of the flag being raised, respectively.

Figure 7:
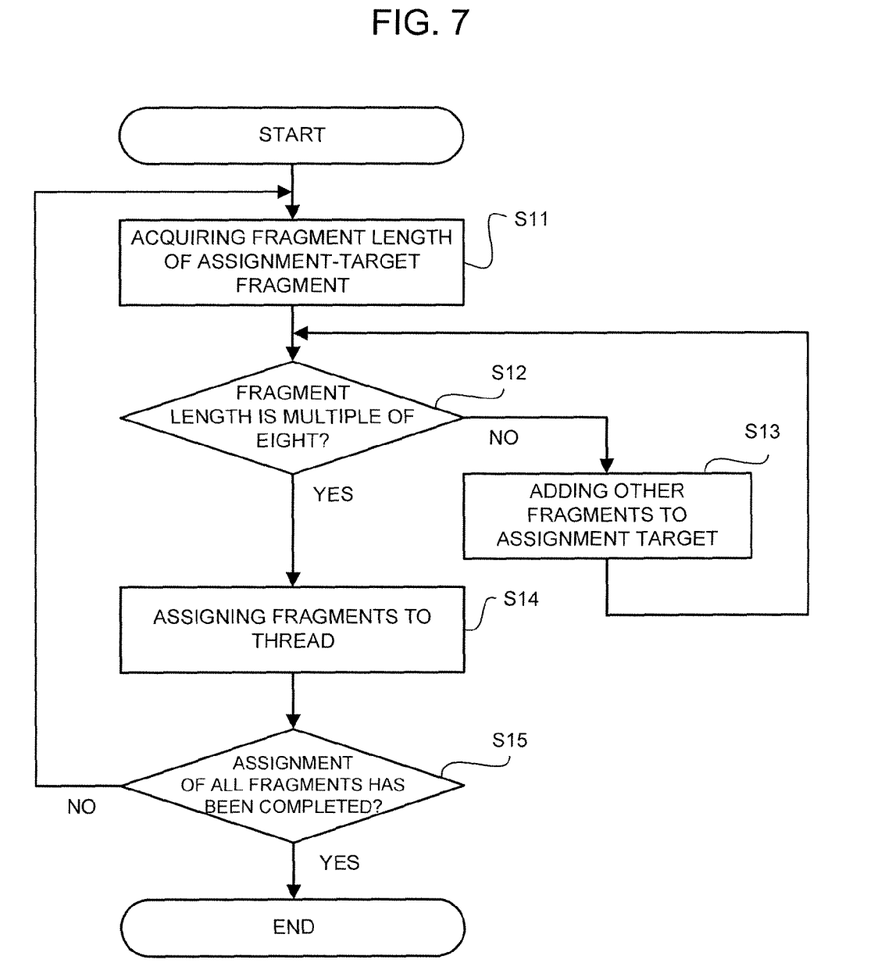
FIG. 7 is a flowchart for explaining a process of assigning the fragments.

Next, the details of the process (the above-mentioned step S2) that the parallel arithmetic processing section 24 decides the fragments to be assigned to each thread will be explained by referring to FIG. 7. The parallel arithmetic processing section 24 specifies the assignment-target fragments from the process-target data, and acquires the fragment length thereof (Step S11). The parallel arithmetic processing section 24 determines whether the fragment length of the assignment-target fragment is a predetermined number, being a multiple of eight (a least common multiple of eight and the fragment, and the like) (Step S12). When the fragment length is not a predetermined number (Step S12: NO), the parallel arithmetic processing section 24 adds other fragments of the process-target data to the assignment-target fragments, calculates the fragment length of the assignment-target fragment again (Step S13), and returns to the Step S12. When the fragment length is a predetermined number (Step S12: YES), the parallel arithmetic processing section 24 assigns the assignment-target fragments to one of the threads (Step S14). The parallel arithmetic processing section 24 determines whether the assignment of all fragments of the process-target data has been completed (Step S15), and finishes the process when the assignment has been completed (Step S15: YES).

When the assignment has not been completed yet (Step S15: NO), the parallel arithmetic processing section 24 returns to the Step S11, and continues to execute the process for the remaining fragments. Additionally, this process is one example, and the other assigning processes may be employed.

Figure 8:
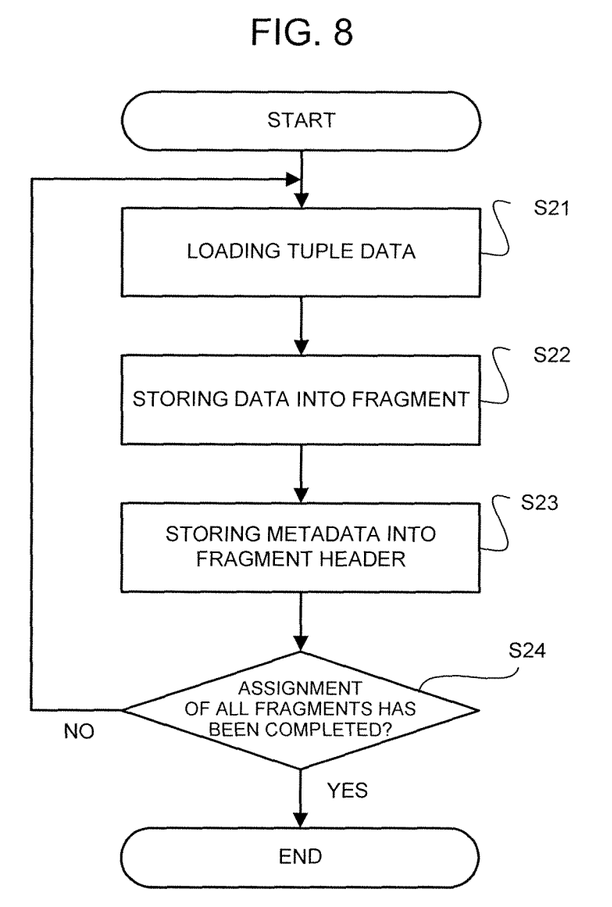
FIG. 8 is a flowchart for explaining a process of preparing the database.

Next, a process that the variable-length data storing/processing section 23 stores the data into the database 10 will be explained by referring to FIG. 8. The variable-length data storing/processing section 23 loads the storage-target data (Step S21). The data to be loaded is the variable-length tuple data containing the fixed-length data of which the unit is a column unit. The variable-length data storing/processing section 23 stores the loaded tuple data into the fragments of the database 10 (Step S22). The fragment has the fixed length, and the length thereof is decided by the variable-length data storage length deciding section 22, based upon a unit of the data process of the parallel arithmetic unit to be employed for this system, and the like. The variable-length data storing/processing section 23 stores the metadata corresponding to the tuple data stored into the fragment into the fragment header of the database 10 (Step S23). The metadata contains the ID for identifying the tuple data, and the offset of the last portion of the above fragment from the leading position of the tuple. The variable-length data storing/processing section 23 determines whether it has been completed to store all of the storage-target data into the database 10 (Step S24), and finishes the process when it has been completed (Step S24: YES). When it has not been completed yet (Step S24: NO), the variable-length data storing/processing section 23 returns to the Step S21, and continues to execute the process for the remaining data. Additionally, this process is one example, and the other storing processes may be employed. Further, the values (for example, a four-byte length, an eight-byte length, a 16-byte length, and the like) pre-set based upon a unit of the data process of the general-purpose parallel arithmetic unit may be employed as the fragment length of the fragment.

As explained above, in accordance with this exemplary embodiment, keeping a balance between the space efficiency and the process efficiency in order to execute the efficient process for the variable-length data on the GPU allows the efficient process to be realized.

The parallel arithmetic unit environment detecting section 21, the variable-length data storage length deciding section 22, the variable-length data storing/processing section 23, the parallel arithmetic processing section 24, and the data processing result storing/reprocessing section 25 relating to the exemplary embodiments of the present invention described above may be realized by loading and executing an operational program etc. stored in the CPU and the coprocessor of the database processing device 20, and further, may be configured with hardware, respectively. A function of one part of the above-mentioned exemplary embodiments can be realized with a computer program.

The whole or part of the exemplary embodiments disclosed above can be described as, but not limited to, the following supplementary note.

(Supplementary Note1)

A data structure of a column store database, the aforementioned data structure of the database including:

a fragment having a fixed length decided according to a unit of a data process of an arithmetic unit, which has tuple data containing variable-length data stored therein; and a fragment header indicating a number indicative of an order of the aforementioned fragments and an offset of a position of the last-portion data of the aforementioned fragment from a leading position of a tuple.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A database processing device, comprising:
a parallel arithmetic unit; and
a central processing unit (CPU), comprising:
    a data storing section that decides a fragment length of a fragment of a column store database based on a unit of a data process of said parallel arithmetic unit, and stores tuple data containing variable-length data into the fragment and metadata of the tuple data stored into said fragment into a fragment header, respectively, in the column store database,
    wherein the data storing section comprises a variable-length data storage length deciding section which measures a data length that appears within a column or fragment set in the column store database, such that the fragment length is matched to the processing ability of the parallel arithmetic unit; and
    a parallel arithmetic section that refers to said metadata when executing a process for data stored in said column store database, decides the fragments to be assigned to each thread that is executed by said parallel arithmetic unit, assigns the fragments to said each thread based upon the decided content, and causes each thread to execute a parallel arithmetic operation.

2. A database processing device according to claim 1, wherein said parallel arithmetic section comprises:
    a first result recoding section that causes each thread to retrieve a character sequence with regard to the assigned fragments, and records data obtained by subjecting byte positions of the fragments to bit reversal as a retrieval result; and
    a second result recoding section that assigns said retrieval results of which a number corresponds to a unit of a data process of said parallel arithmetic unit to each thread, causes each thread to detect the bit reversal with regard to said assigned retrieval result, and records the detection result as a detection result with a tuple level.

3. A database processing method in a database processing device including a parallel arithmetic unit, comprising:
    a data storing process of deciding, by a central processing unit (CPU), a fragment length of a fragment of a column store database based on a unit of a data process of said parallel arithmetic unit, and storing, by the CPU, tuple data containing variable-length data into the fragment and metadata of the tuple data stored into said fragment into a fragment header, respectively, in the column database,
    wherein the data storing section comprises a variable-length data storage length deciding section which measures a data length that appears within a column or fragment set in the column store database, such that the fragment length is matched to the processing ability of the parallel arithmetic unit;
    a parallel arithmetic process of referring, by the CPU, to said metadata when executing a process for data stored in said column store database, deciding, by the CPU, the fragments to be assigned to each thread that is executed by said parallel arithmetic unit, assigning, by the CPU, the fragments to said each thread based upon the decided content, and causing, by the CPU, said each thread to execute a parallel arithmetic operation.

4. A database processing method according to claim 3, wherein said parallel arithmetic process comprises:

retrieving a character sequence with regard to the assigned fragments in each thread, and recording data obtained by subjecting byte positions of the fragments to bit reversal as a retrieval result; and assigning said retrieval results of which a number corresponds to a unit of a data process of said parallel arithmetic unit to each thread, detecting the bit reversal with regard to said assigned retrieval result in each thread, and recording the detection result as a detection result with a tuple level.

5. A non-transitory computer readable storage medium storing a program for causing a computer including a parallel arithmetic unit to execute:

a data storing process of deciding a fragment length of a fragment of a column store database based on a unit of a data process of said parallel arithmetic unit, and storing tuple data containing variable-length data into the fragment and metadata of the tuple data stored into said fragment into a fragment header, respectively, in the column store database, wherein the data storing section comprises a variable-length data storage length deciding section which measures a data length that appears within a column or fragment set in the column store database, such that the fragment length is matched to the processing ability of the parallel arithmetic unit; and a parallel arithmetic process of referring to said metadata when executing a process for data stored in said column store database, deciding the fragments to be assigned to each thread that is executed by said parallel arithmetic unit, assigning the fragments to said each thread based upon the decided content, and causing each thread to execute a parallel.

6. A computer readable storage medium according to claim 5, wherein said parallel arithmetic process comprises:

a process of retrieving a character sequence with regard to the assigned fragments in each thread, and recording data obtained by subjecting byte positions of the fragments to bit reversal as a retrieval result; and a process of assigning said retrieval results of which a number corresponds to a unit of a data process of said parallel arithmetic unit to each thread, detecting the bit reversal with regard to said assigned retrieval result in each thread, and recording the detection result as a detection result with a tuple level.

7. A database processing device according to claim 1, wherein the database processing device is connected to the column store database via a network.

8. A database processing device according to claim 1, wherein the parallel arithmetic unit comprises a graphics processing unit (GPU).

9. A database processing device according to claim 1, wherein the column store database comprises a data structure including:

a plurality of fragments including a fragment having a fixed length decided according to a unit of a data process of an arithmetic unit, which has tuple data containing variable- length data stored therein.

10. A database processing device according to claim 9, wherein the data structure further includes:

a fragment header indicating a number indicative of an order of the plurality of fragments and an offset of a position of the last-portion data of the fragment from a leading position of a tuple.

11. A database processing device according to claim 10, wherein the CPU further comprises a parallel arithmetic unit environment detecting section which acquires information associated with a processing ability of the parallel arithmetic unit.

12. A database processing device according to claim 11, wherein the data storing section comprises a variable-length data storage length deciding section which decides the fragment length based upon the information acquired by the parallel arithmetic unit environment detecting section.

13. A database processing device according to claim 12, wherein the variable-length data storage length deciding section sets a data length suitable for a unit of a data process of the parallel arithmetic unit, as the fragment length.

14. A database processing device according to claim 12, wherein the data storing section further comprises a variable-length data storing/processing section which stores the data into the column store database based upon the fragment length decided by the variable-length data storage length deciding section, a variable-length tuple data including fixed-length data of which a unit is a column unit stored into a fixed-length fragment, and the tuple data of a column being stored into a fragment set that is composed of a plurality of fragments responding to a necessity.

15. A database processing device according to claim 14, wherein the parallel arithmetic section comprises a parallel arithmetic processing section which executes the process for the data stored in the column store database, wherein in retrieving a character sequence from the column store database, the parallel arithmetic processing section secures a region for storing a result set of the retrieval process, the region for securing the result of the retrieval being given with bits for each byte inside the fragment in order to cope with a plurality of hit results.

16. A database processing device according to claim 15, wherein in retrieving a character sequence from the column store database, the parallel arithmetic processing section causes each thread to execute the parallel arithmetic operation such that:

if the thread is given a variable-length byte sequence, being a retrieval target, then the thread calculates a length of the byte sequence of the retrieval-target;

the thread is given a position of the fragment set of which charge the above thread should take; and the thread executes a retrieval process of sequentially loading designated fragments and determining whether the retrieval-target byte sequence appears in the loaded fragments.

* * * * *